(12) United States Patent
Gohl et al.

(10) Patent No.: US 7,211,020 B2
(45) Date of Patent: May 1, 2007

(54) LOCKABLE DIFFERENTIAL WITH LOCKING STATE DETECTION SYSTEM

(75) Inventors: Jonathan R. Gohl, Waterford, MI (US); Jason E. Moore, Clarkston, MI (US); Jeffrey E. Rea, Clarkston, MI (US); Andrew F. Pinkos, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 189 days.

(21) Appl. No.: 11/137,997

(22) Filed: May 26, 2005

(65) Prior Publication Data

US 2006/0270508 A1    Nov. 30, 2006

(51) Int. Cl.
*F16H 48/06* (2006.01)
(52) U.S. Cl. ..................................... 475/231
(58) Field of Classification Search ............... 475/231, 475/150; 74/335
See application file for complete search history.

(56) References Cited

U.S. PATENT DOCUMENTS

| 3,732,752 | A | 5/1973 | Louckes et al. |
| 5,157,966 | A | 10/1992 | Lugosi et al. |
| 5,867,092 | A | 2/1999 | Vogt |
| 5,984,823 | A | 11/1999 | Gage |
| 5,989,147 | A | 11/1999 | Forrest et al. |
| 6,038,506 | A | 3/2000 | Dickhans et al. |
| 6,203,464 | B1 | 3/2001 | Ishikawa et al. |
| 6,309,321 | B1* | 10/2001 | Valente ....................... 475/249 |
| 6,334,832 | B1 | 1/2002 | Heravi et al. |
| 6,527,664 | B2 | 3/2003 | Hunt |
| 6,958,030 | B2* | 10/2005 | DeGowske .................. 475/231 |
| 7,022,040 | B2* | 4/2006 | DeGowske et al. ......... 475/231 |

FOREIGN PATENT DOCUMENTS

EP    1 435 479 A2    7/2004

* cited by examiner

*Primary Examiner*—Dirk Wright
(74) *Attorney, Agent, or Firm*—Harness, Dickey & Pierce, P.L.C.

(57) ABSTRACT

A power transmitting device including a housing having an input shaft, at least one output shaft and a gear set positioned in the housing. The gear set transmits rotary power between the input shaft and the output shaft. An electrical actuator includes a linearly moveable member and is operable to drivingly engage the moveable member with the gear set. A sensor is positioned within the housing and operable to output a signal indicative of the linear position of the moveable member.

33 Claims, 12 Drawing Sheets

LOCKABLE DIFFERENTIAL WITH LOCKING STATE DETECTION SYSTEM

BACKGROUND OF THE INVENTION

The present invention generally relates to differentials for motor vehicles and, more particularly, to a locking differential with a locking state detection system.

As is known, many motor vehicles are equipped with driveline systems including differentials which function to drivingly interconnect an input shaft and a pair of output shafts. The differential functions to transmit drive torque to the output shafts while permitting speed differentiation between the output shafts.

Conventional differentials include a pair of side gears fixed for rotation with the output shafts and two or more sets of meshed pinion gears mounted within a differential case. However, the conventional differential mechanism has a deficiency when a vehicle is operated on a slippery surface. When one wheel of the vehicle is on a surface having a low coefficient of friction, most or all of the torque will be delivered to the slipping wheel. As a result, the vehicle often becomes immobilized.

To overcome this problem, it is known to provide a mechanical differential where an additional mechanism limits or selectively prevents differentiation of the speed between the output shafts. Typically, the mechanical device used to provide the limited-slip or non-slip function is a friction clutch. The friction clutch is a passive device which limits the differential speed between the output shafts only after a certain differential speed has been met. Additionally, such mechanical devices may not be selectively disengaged during operation of anti-lock braking systems or vehicle traction control systems. For example, four-wheel anti-lock braking systems may attempt to measure and control the rotational speed of each wheel independently. If a mechanical type limited slip differential is present, independent control of the speed of each wheel coupled to a differential is no longer possible. Accordingly, it would be desirable to provide an improved differential which may be actively controlled in conjunction with other control systems present on the vehicle. A detection system operable to determine the present state of operation of the differential may also be desirable.

SUMMARY OF THE INVENTION

The present invention relates to a power transmitting device including a housing having an input shaft, at least one output shaft and a gear set positioned in the housing. The gear set transmits rotary power between the input shaft and the output shaft. An electrical actuator includes a linearly moveable member and is operable to drivingly engage the moveable member with the gear set. A sensor is positioned within the housing and operable to output a signal indicative of the linear position of the moveable member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is directed to an improved differential with a locking state detection system for a drivetrain of a motor vehicle. The differential of the present invention includes an actuator operable to place the differential in an "open" or "locked" condition. The detection system provides a signal indicating if the differential is in the "open" or "locked" condition. It should be appreciated that the differential of the present invention may be utilized with a wide variety of driveline components and is not intended to be specifically limited to the particular application described herein. In addition, the actuator of the differential of the present invention may be used in conjunction with many types of differentials such as those having a bevel gear design or a parallel-axis helical design which may be of an open or limited-slip variety.

Figure 1:
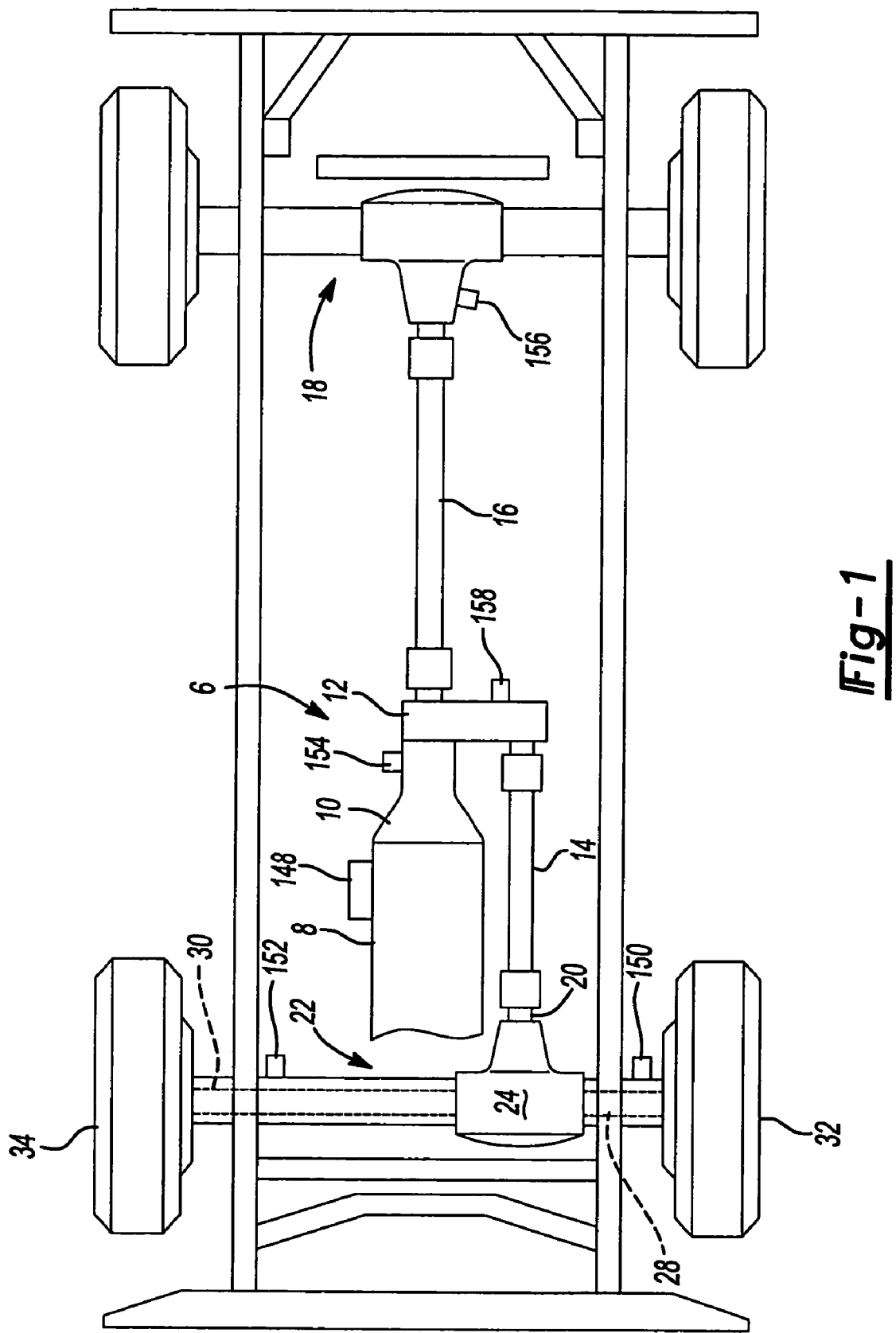
FIG. 1 is a schematic view of an exemplary motor vehicle drivetrain including a differential assembly of the present invention.
Figure 2:
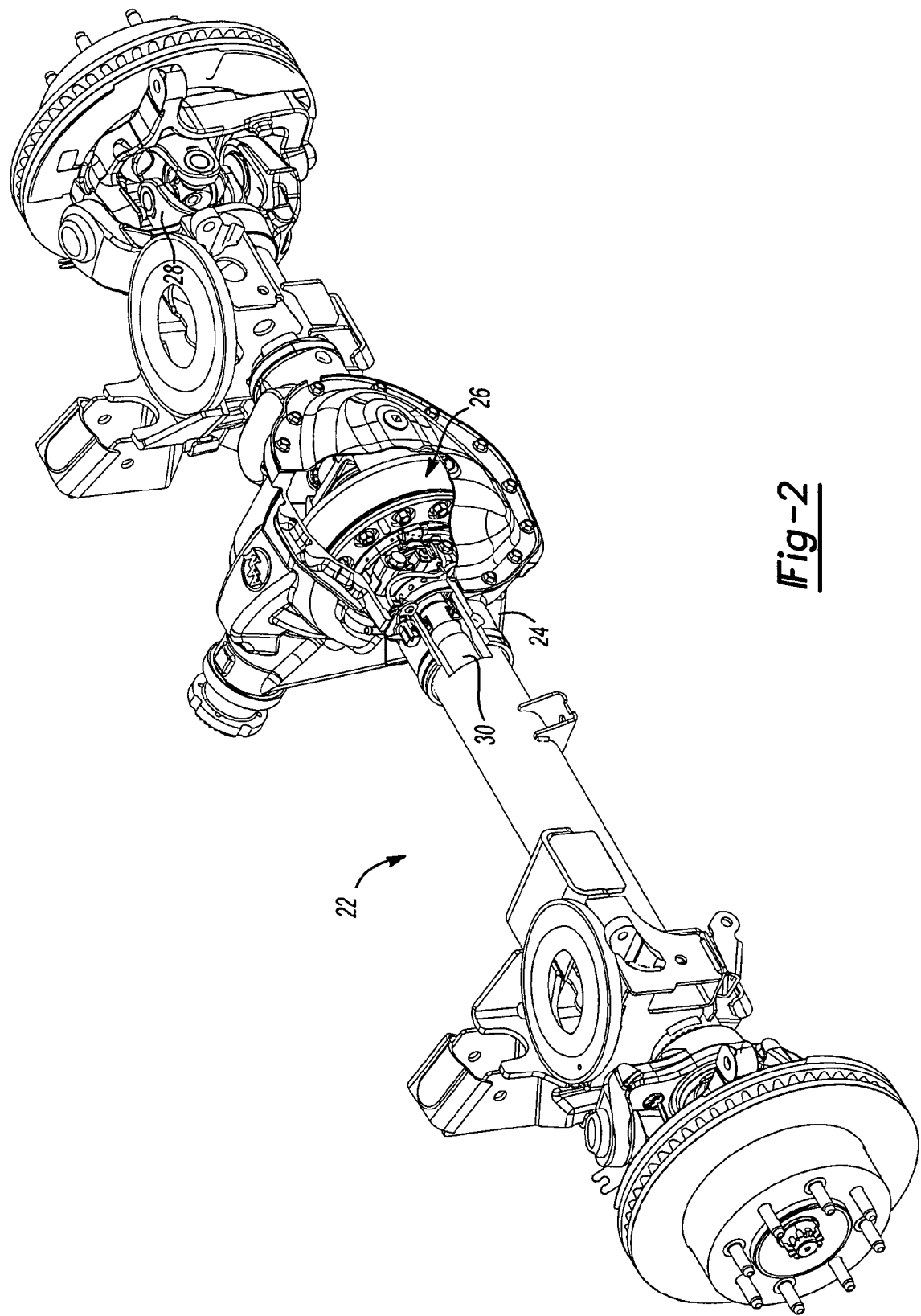
FIG. 2 is a fragmentary perspective view of a front driving axle of the present invention.
Figure 3:
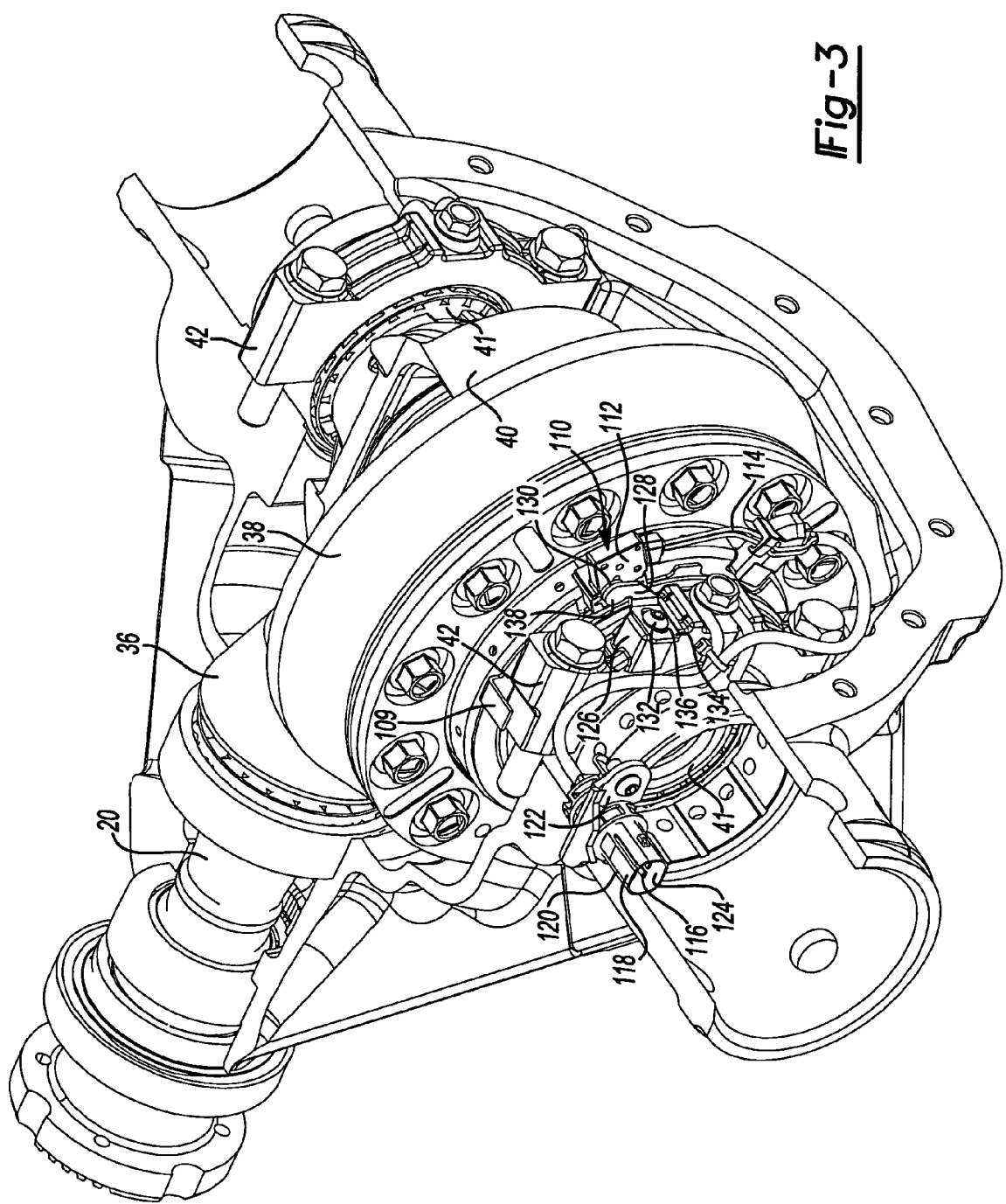
FIG. 3 is a fragmentary perspective view of the front driving axle of the present invention.

With reference to FIGS. 1–3, a drivetrain 6 for an exemplary motor vehicle is shown to include an engine 8, a transmission 10, a transfer case 12, a forward propeller shaft 14 and a rearward propeller shaft 16. Rearward propeller shaft 16 provides torque to a rear axle assembly 18. Forward propeller shaft 14 provides torque from engine 8 to a pinion shaft 20 of a front axle assembly 22. Front axle assembly 22 includes an axle housing 24, a differential assembly 26 supported in axle housing 24 and a pair of axle shafts 28 and 30 respectively interconnected to left and right and front wheels 32 and 34.

Figure 4:
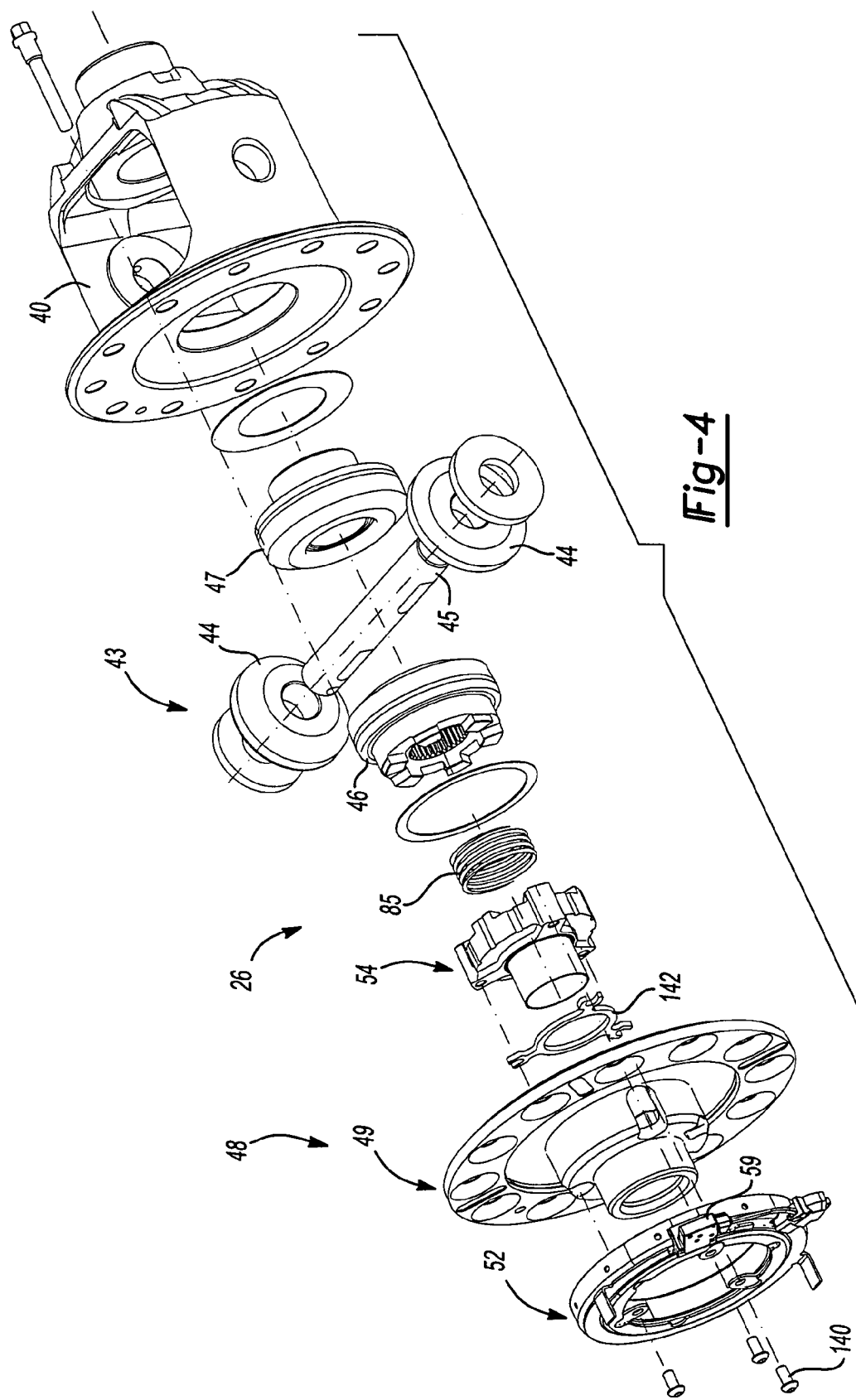
FIG. 4 is an exploded perspective view of a differential assembly of the present invention.
Figure 5:
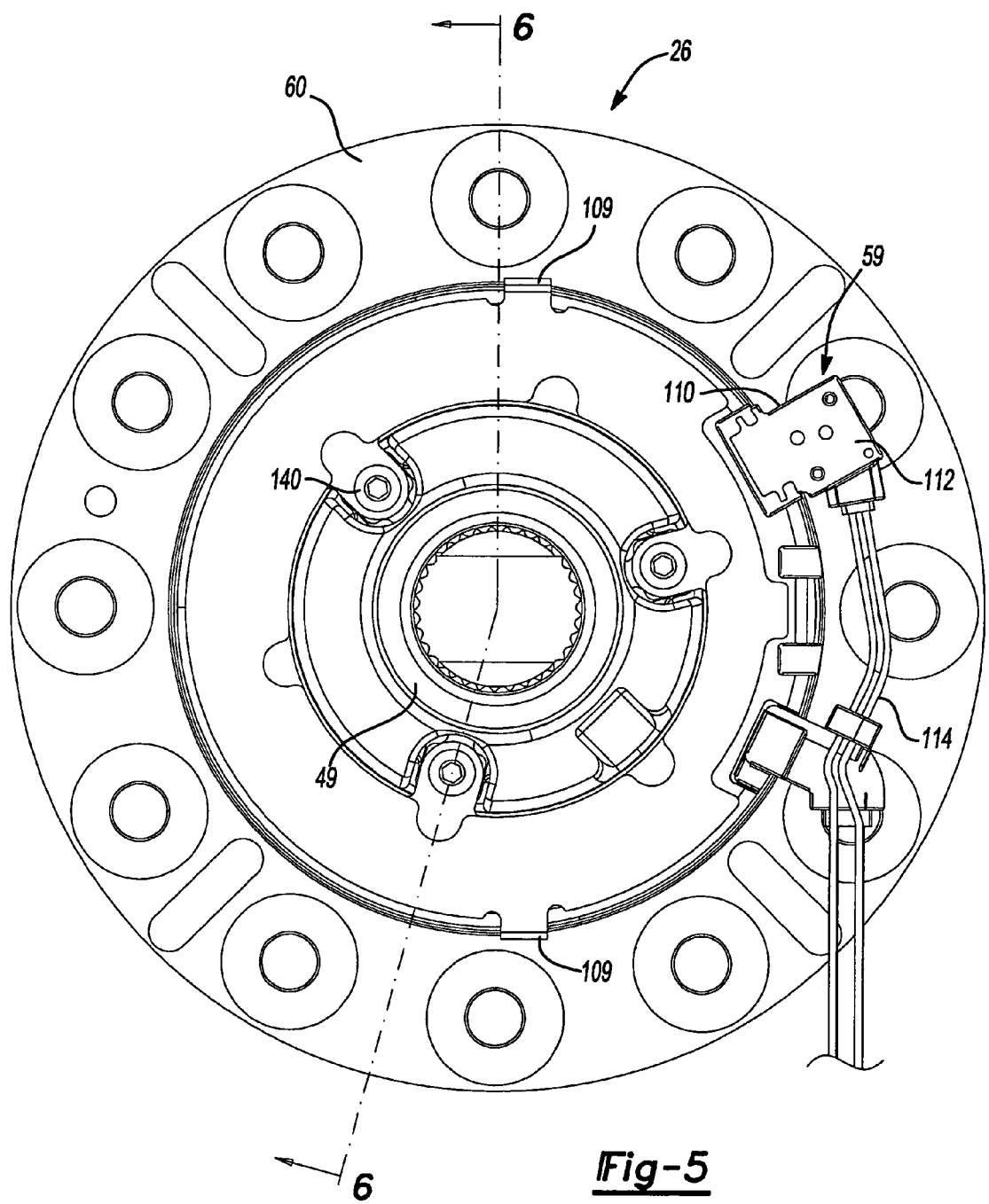
FIG. 5 is an end view of the differential assembly of the present invention.

Pinion shaft 20 has a pinion gear 36 fixed thereto which drives a ring gear 38 that is fixed to a differential case 40 of differential assembly 26. Differential case 40 is rotatably supported by bearings 41. Bearings 41 are retained by bearing caps 42 coupled to axle housing 24. A gearset 43 (FIG. 4) supported within differential case 40 transfers rotary power from differential case 40 to axle shafts 28 and 30, and facilitates relative rotation (i.e., differentiation) therebetween. Thus, rotary power from engine 8 is transmitted to axle shafts 28 and 30 for driving front wheels 32 and 34 via transmission 10, transfer case 12, forward propeller shaft 14, pinion shaft 20, differential case 40 and gearset 43. While differential assembly 26 is depicted in a front-wheel drive application, the present invention is contemplated for use in differential assemblies installed in trailing axles, rear axles, transfer cases for use in four-wheel drive vehicles and/or any other known vehicular driveline application.

FIGS. 4–8 depict differential assembly 26 to include differential case 40 and gearset 43. Gearset 43 includes a pair of pinion gears 44 rotatably supported on a cross shaft 45. First and second side gears 46 and 47 are drivingly interconnected to pinion gears 44 and axle shafts 28 and 30. Differential assembly 26 also includes an actuator and sensor assembly 48 operable to selectively couple first side gear 46 to differential case 40, thereby placing differential assembly 26 in a fully locked condition.

A cap 49 is coupled to differential case 40 to define a pocket 50 for receipt of actuator and sensor assembly 48. Actuator and sensor assembly 48 includes a solenoid assembly 52, an actuating ring 54, a draw plate 56, a retainer 58 and a sensor assembly 59. Cap 49 includes a flange 60 coupled to a flange 62 of case 40. Flange 60 of cap 49 includes a recess 64 sized to receive a portion of solenoid assembly 52 during actuation. Cap 49 includes a pair of stepped bores 66 and 68 which define pocket 50. Specifically, first bore 66 includes an annular surface 70 while second bore 68 includes an annular surface 72. First bore 66 includes an end face 74 radially inwardly extending from annular surface 70. An aperture 76 extends through the cap 49 and is in communication with second bore 68 where aperture 76 and second bore 68 are sized to receive a portion of the axle shaft.

Figure 6:
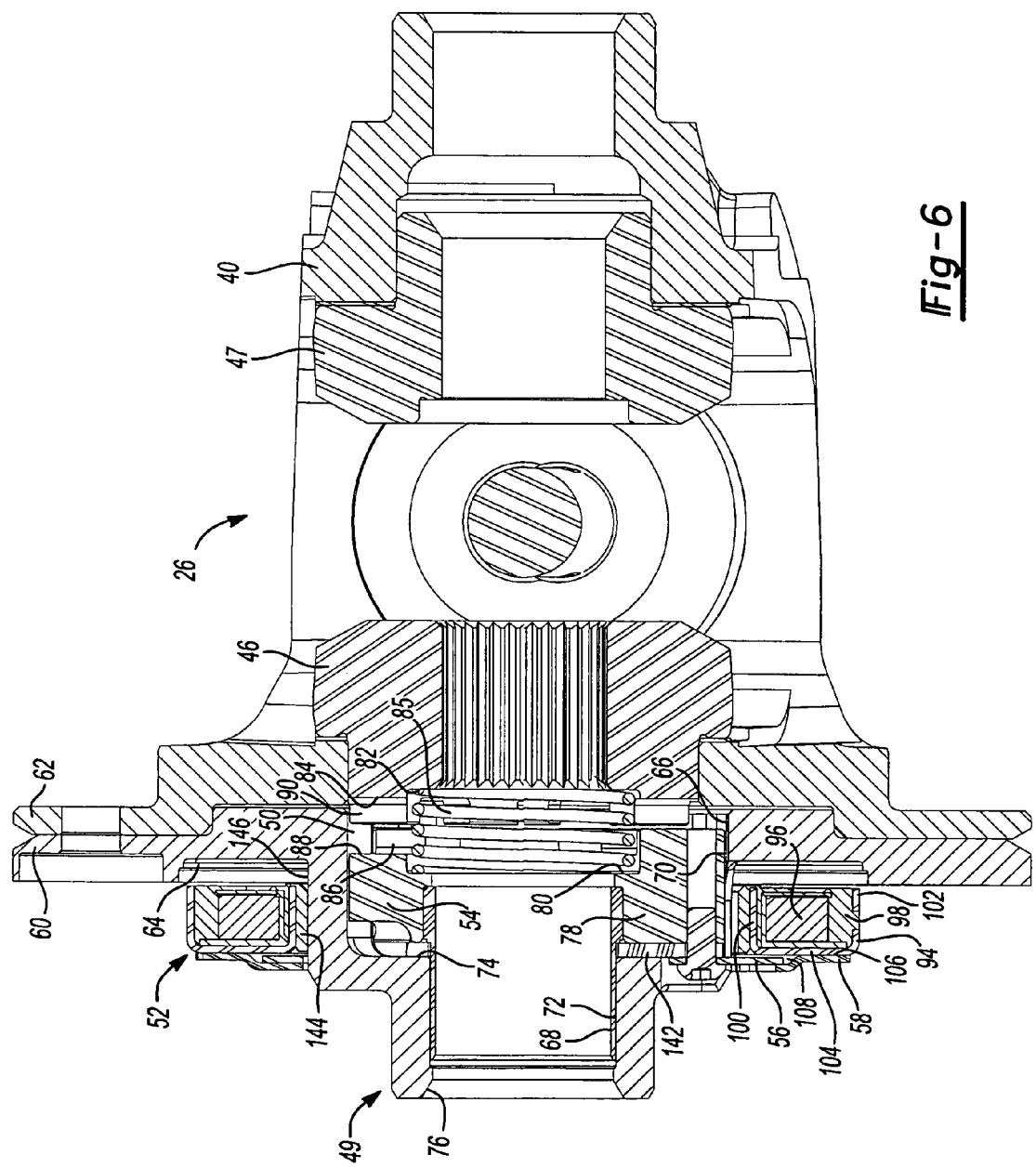
FIG. 6 is a cross-sectional side view of the differential assembly of the present invention taken along line 6—6 in FIG. 5.
Figure 7:
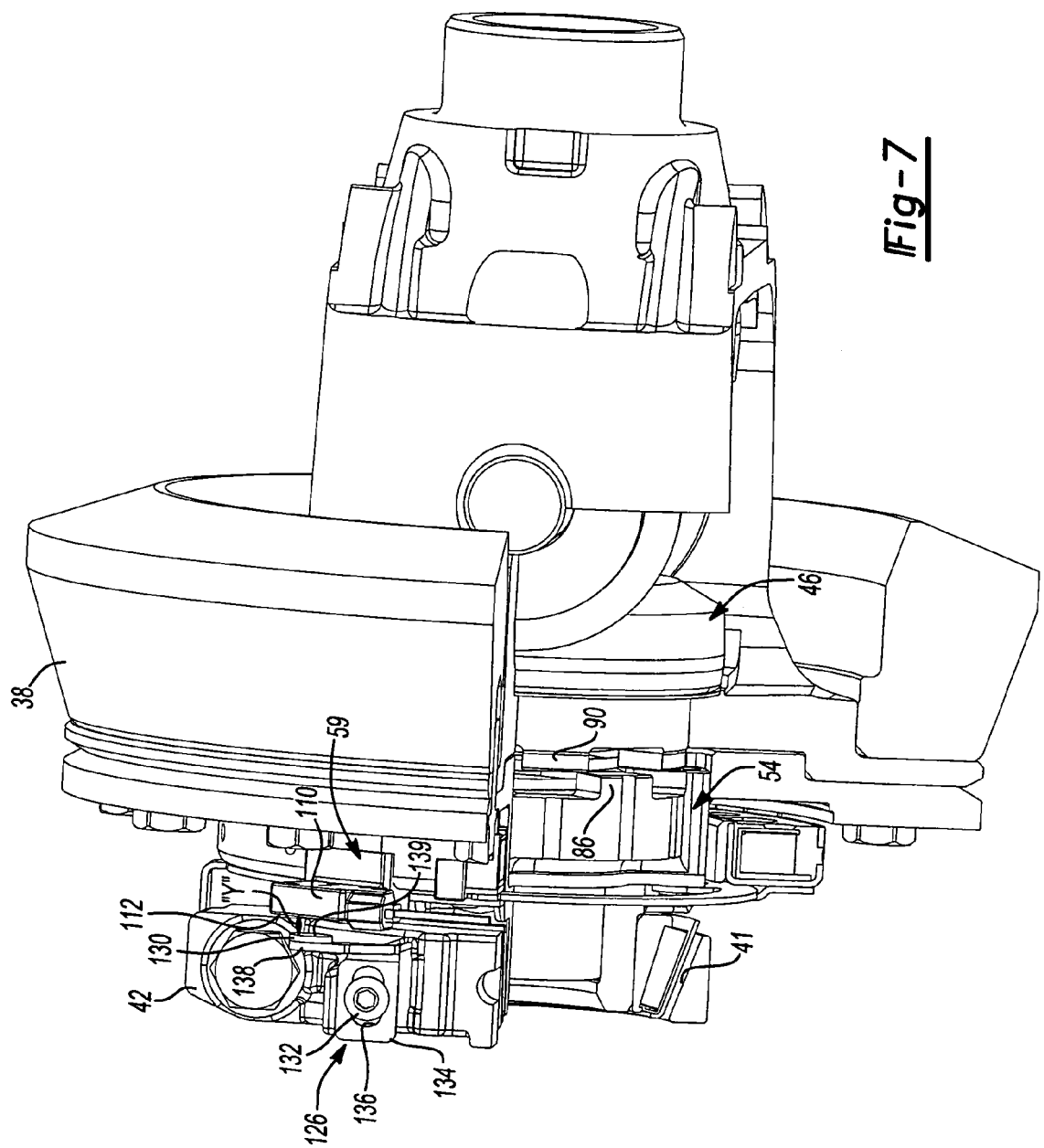
FIG. 7 is a fragmentary side view of the differential assembly of the present invention showing the actuating ring in a position disengaged from the side gear.

Actuating ring 54 includes a generally hollow cylindrical body 78 having an annular recess 80 formed at one end. Side gear 46 includes a similarly sized annular recess 82 formed on an outboard face 84. A compression spring 85 is positioned between actuating ring 54 and side gear 46 within annular recesses 80 and 82. A plurality of axially extending dogs 86 protrude from an end face 88 of actuating ring 54. A corresponding plurality of dogs 90 axially extend from face 84 of side gear 46. Actuating ring 54 is moveable from a disengaged position as shown in FIGS. 6 and 7 to an engaged position shown in FIG. 8. In the disengaged position, dogs 86 of actuating ring 54 are released from engagement with dogs 90 of side gear 46. In contrast, when actuating ring 54 is moved to its engaged position, dogs 86 engage dogs 90 to rotatably fix side gear 46 to differential case 40.

Solenoid assembly 52 includes a metallic cup 94 and a coil of wire 96. The wire is positioned within cup 94 and secured thereto by an epoxy 98. Cup 94 includes an inner annular wall 100, an outer annular wall 102 and an end wall 104 interconnecting annular walls 100 and 102. Retainer 58 is a substantially disc-shaped member having an outer edge 106 mounted to end wall 104 of cup 94. A portion of retainer 58 is spaced apart from end wall 104 to define a slot 108.

Retainer 58 includes a pair of axially extending tabs 109 positioned proximate to bearing cap 42. Tabs 109 restrict rotation of retainer 58 relative to axle housing 24. Sensor assembly 59 is mounted to retainer 58. Sensor assembly 59 includes a Hall element 110 having a substantially rectangular body. Hall element 110 includes a first face 112 extending substantially perpendicularly to the axis of rotation of axle shafts 28 and 30. Sensor assembly 59 also includes a pair of wires 114 extending from Hall element 110 that end at terminals 116 mounted within a connector 118. Connector 118 includes a body 120 extending through an aperture 122 formed in axle housing 24. The ends of the wire wound at coil 96 terminate at terminals 124 mounted within connector 118. In this manner, electrical connection to solenoid assembly 52 and sensor assembly 59 may be made from outside of axle housing 24.

A target 126 includes a bracket 128, a magnet 130 and a fastener 132. Bracket 128 includes a first leg 134 having an aperture 136 extending therethrough. Fastener 132 extends through aperture 136 and is used to mount target 126 to bearing cap 42. Bracket 128 includes a second leg 138 positioned at a right angle to first leg 134. Second leg 138 is substantially planar and positioned substantially parallel to first face 112 of Hall element 110. Magnet 130 is a substantially cylindrical disk-shaped member mounted to second leg 138. Accordingly, magnet 130 includes an outer surface 139 (shown in FIG. 7) positioned substantially parallel to first face 112. One skilled in the art will appreciate that the sensor and magnet may be re-oriented 90 degrees to the orientation shown in the Figures. As such, the orientation of sensor and magnet shown in the drawings is merely exemplary and should not limit the scope of the invention.

Draw plate 56 is positioned within slot 108 defined by retainer 58 and coupled to actuating ring 54 via a plurality of fasteners 140. A washer 142 is positioned between cap 49 and actuating ring 54. Preferably, washer 142 is constructed from a non-ferromagnetic material so as to reduce any tendency for actuating ring 54 to move toward end face 74 of metallic cap 49 instead of differential case 40 during energization of solenoid assembly 52. A bearing 144 supports cup 94 on an outer journal 146 of cap 49.

Figure 8:
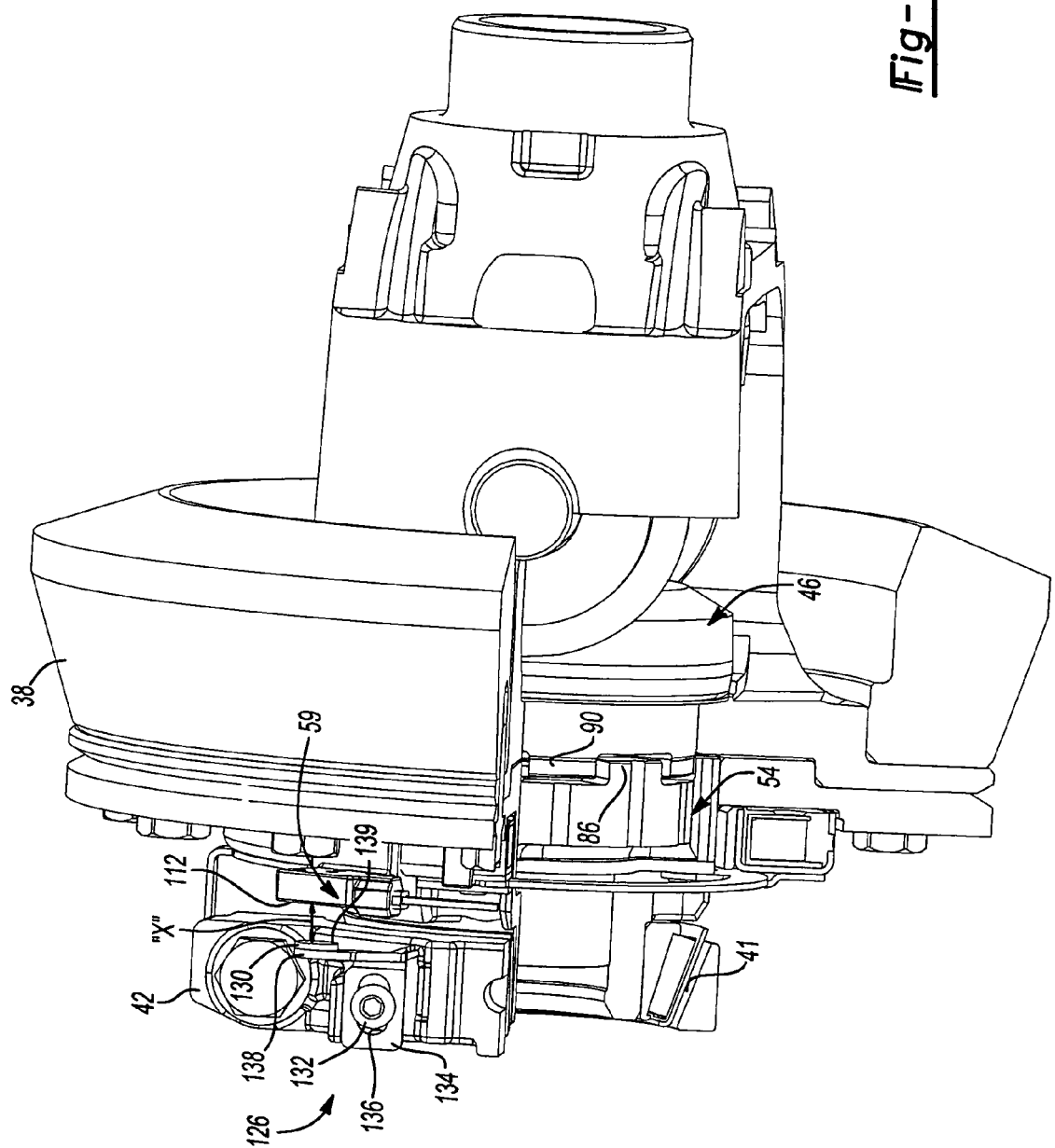
FIG. 8 is a fragmentary side view of the differential assembly of the present invention showing the actuating ring drivingly engaged with the side gear.

Coil 96 is coupled to a controller 148 (FIG. 1) that operates to selectively energize and de-energize coil 96. During coil energization, a magnetic field is generated by current passing through coil 96. The magnetic field causes actuator and sensor assembly 48 to be drawn toward flange 60 of cap 49. As solenoid assembly 52 enters recess 64, dogs 86 of actuating ring 54 engage dogs 90 of side gear 46. Once the dogs are engaged, actuating ring 54 is in its engaged position and differential assembly 26 is in a fully locked condition as shown in FIG. 8. In the fully locked position, the Hall element 110 encompassed in sensor assembly 59 is spaced apart from outer surface 139 of magnet 130 by a distance "X." At distance "X," magnet 130 generates a predetermined magnetic field density. Sensor assembly 59 outputs a signal indicative of the axial position of actuating ring 54. This signal is used by controller 148 as verification that differential assembly 26 is in a fully locked position.

One skilled in the art will appreciate that the axially moveable electromagnet of the present invention provides a simplified design having a reduced number of components. Additionally, the present invention utilizes the entire differential case as the armature for the electromagnet. This allows a more efficient use of the available magnetic force. These features allow a designer to reduce the size of the electromagnet because the armature more efficiently utilizes the electromotive force supplied by the electromagnet. Such a compact design allows for minor modification of previously used components and packaging with a standard sized axle housing.

To place differential assembly 26 in the open, unlocked condition, current is discontinued to coil 96. The magnetic field ceases to exist once current to coil 96 is stopped. At this time, compression in spring 85 causes actuator and sensor assembly 48 to axially translate and disengage dogs 86 from dogs 90. Accordingly, side gear 46 is no longer drivingly coupled to differential case 40, thereby placing differential assembly 26 in the open condition shown in FIG. 7. When differential assembly is in the open, unlocked condition, Hall element 110 is positioned substantially closer to target 126 than when differential assembly 26 was in the locked position. Specifically, first face 112 is spaced apart from outer surface 139 of magnet 130 a distance "Y" when coil 96 is not energized. At distance "Y," the magnetic field density generated by magnet 130 is significantly greater than the field density at distance "X." Sensor assembly 59 is configured to output a signal to controller 148 indicating that actuating ring 54 is at a position where dogs 86 are disengaged from dogs 90 and the differential is in an open condition. It should also be appreciated that actuation and deactuation times are very short due to the small number of moving components involved. Specifically, no relative ramping or actuation of other components is required to cause engagement or disengagement of dogs 86 and dogs 90.

Electronic controller 148 controls the operation of actuator and sensor assembly 48. Electronic controller 148 is in receipt of data collected by a first speed sensor 150 and a second speed sensor 152 as shown in FIG. 1. First speed sensor 150 provides data corresponding to the rotational speed of axle shaft 28. Similarly, second speed sensor 152 measures the rotational speed of axle shaft 30 and outputs a signal to controller 148 indicative thereof. Depending on the data collected at any number of vehicle sensors such as a gear position sensor 154, a vehicle speed sensor 156, a transfer case range position sensor or a brake sensor 158 as shown in FIG. 1, controller 148 will determine if an electrical signal is sent to coil 96. Controller 148 compares the measured or calculated parameters to predetermined values and outputs an electrical signal to place differential assembly 26 in the locked position only when specific conditions are met. As such, controller 148 assures that an "open" condition is maintained when events such as anti-lock braking occur. The "open" condition is verified by the signal output from sensor assembly 59. Limiting axle differentiation during anti-lock braking would possibly counteract the anti-lock braking system. Other such situations may be programmed within controller 148.

Figure 9:
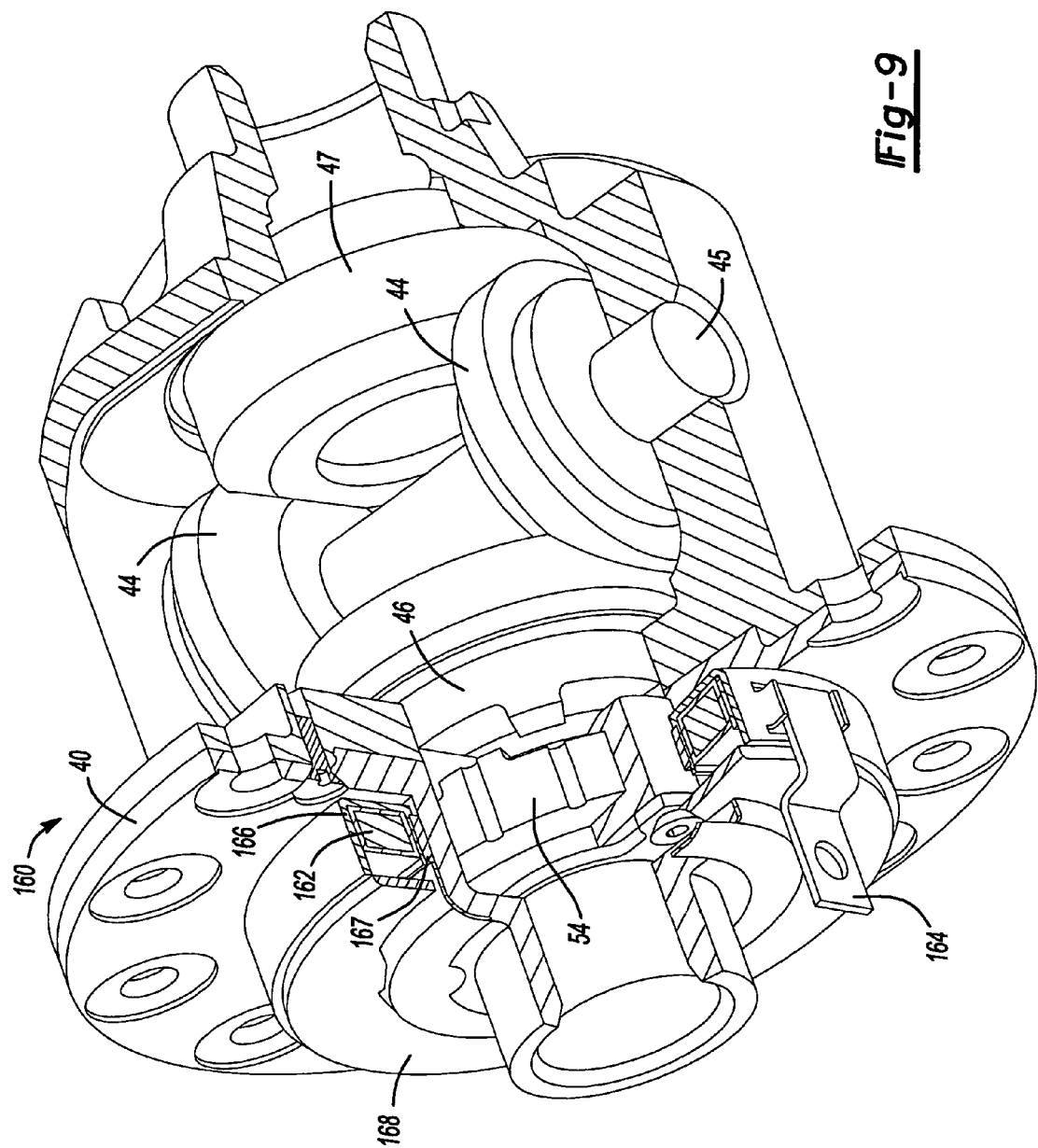
FIG. 9 is a fragmentary perspective of a second embodiment differential assembly.

FIG. 9 depicts a second embodiment differential assembly 160. Differential assembly 160 is substantially similar to differential assembly 26. For clarity, like elements have been identified with previously introduced reference numerals. Differential assembly 160 differs from differential assembly 26 in that a coil 162 is rotatably mounted on differential case 40 in a fixed axial position. An anti-rotation bracket 164 interconnects a cup 166 with the axle housing 24 (FIG. 3) to restrict coil 162 from rotation. A bearing 167 rotatably supports cup 166 to allow the differential case 40 to rotate relative to the coil 162 during operation of the differential assembly.

Through the use of a stationary coil 162, power supply and sensor wire routing complexities may be reduced because the wires no longer need to account for axial movement of the coil. As such, coil 162 does not axially translate nor rotate during any mode of operation of differential assembly 160. An axially moveable armature 168 is coupled to actuating ring 54. Armature 168 is shaped as an annular flat ring positioned proximate coil 162. Armature 168 and actuating ring 54 are drivingly coupled to differential case 40 and axially moveable relative to coil 162 and differential case 40. Armature 168 and actuating ring 54 are biased toward a disengaged, open differential, position shown in FIG. 9 by a compression spring as previously described in relation to differential assembly 26.

To place differential assembly 160 in a locked condition, coil 162 is energized to generate a magnetic field. Armature 168 is constructed from a ferromagnetic material. Accordingly, armature 168 and actuating ring 54 are axially displaced to drivingly engage actuating ring 54 with side gear 46 to place differential assembly 160 in a locked condition.

While a front drive axle assembly has been described in detail, it should be appreciated that the power transmitting device of the present invention is not limited to such an application. Specifically, the present invention may be used in rear drive axles, transaxles for front-wheel drive vehicles, transfer cases for use in four-drive vehicles and/or a number of other vehicular driveline applications.

Figure 10:
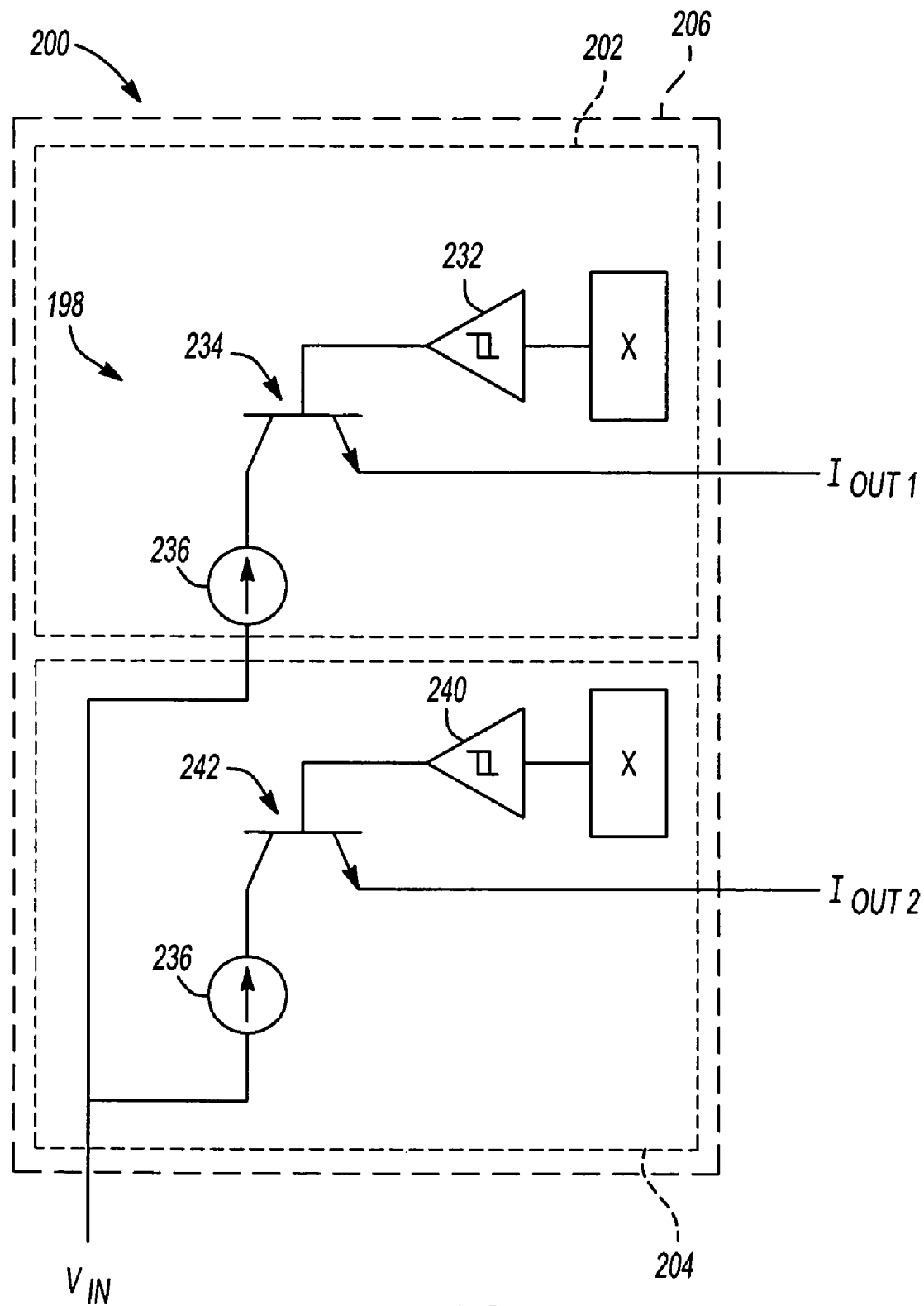
FIG. 10 is a schematic depicting a circuit including a second embodiment sensor assembly.

FIG. 10 depicts a circuit 198 having a second embodiment sensor assembly 200. Sensor assembly 200 includes a first Hall element 202, a second Hall element 204 and a body 206 encompassing both of the Hall elements. Sensor assembly 200 is shaped substantially similarly to sensor assembly 59. Sensor assembly 200 is positioned in communication with a differential assembly in a substantially similar manner to sensor assembly 59. Accordingly, the description relating to the mounting of sensor assembly 200 within the axle assembly will not be reiterated.

Due to the nature of Hall effect devices, permanent magnets and the general environment in which sensor assembly 200 is required to function, a very large mechanical hysteresis is inherent in the system. Mechanical hysteresis in this instance is best described as the absolute distance the sensor assembly must travel in relation to the target magnet in order to change its output state. The Hall effect device switches state, or outputs a different signal, based on the Hall element being exposed to a changing magnetic field density. The Hall effect device may be configured to start switching at a predetermined magnetic field density described as its operating point (Bop) and the field density must change an amount equal to the inherent hysteresis (Bhys) of the Hall effect device in order to switch.

Figure 11:
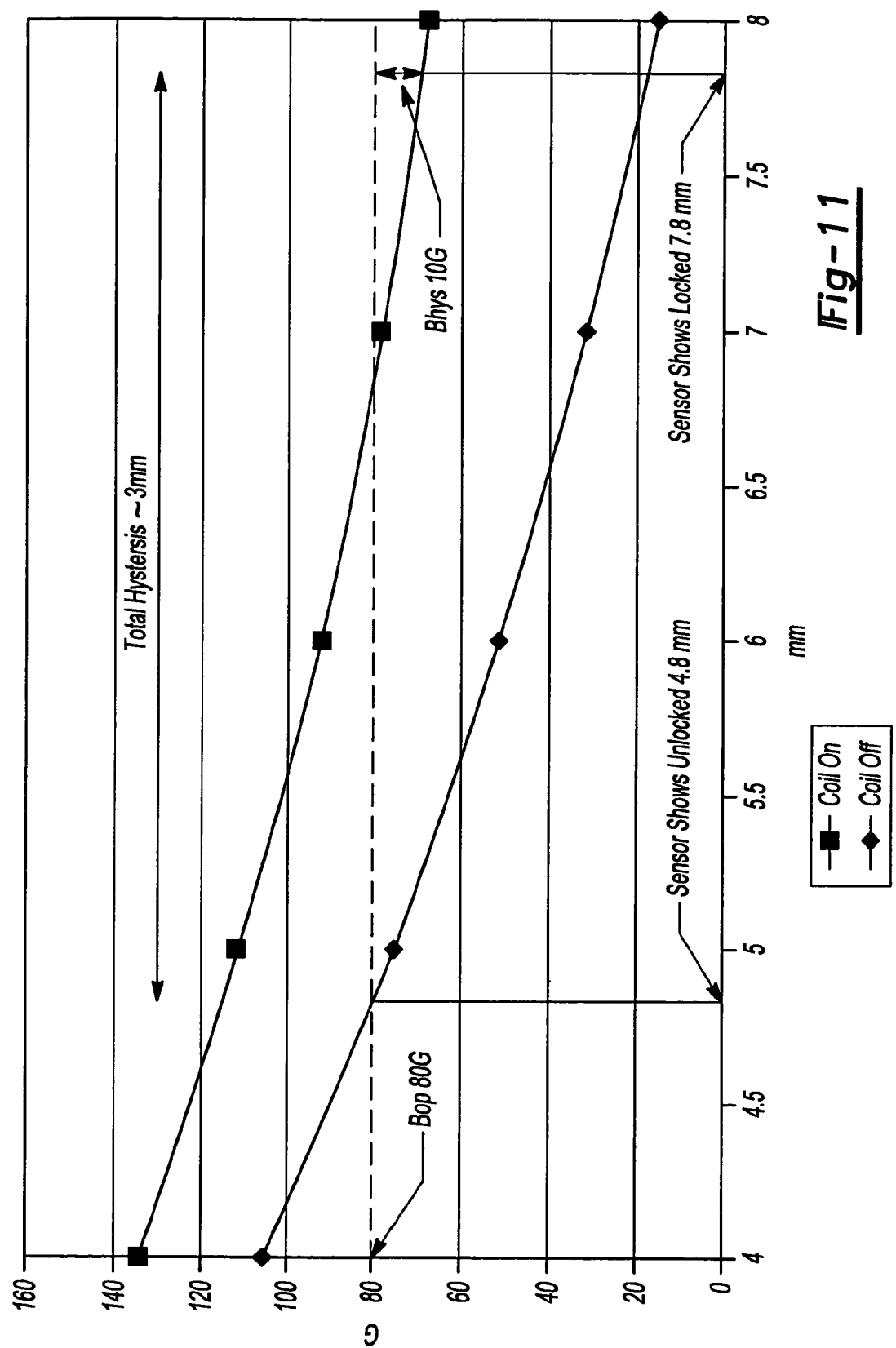
FIG. 11 is a graph showing magnetic field density vs. distance for a first embodiment sensor assembly.

FIG. 11 is a graph showing magnetic field density versus distance for the first embodiment sensor assembly 59 shown in FIGS. 4–8. As shown in FIG. 11, permanent magnet 130 generates an exponentially decaying field density, measured in gauss versus the distance traveled in millimeters. For example, if Hall element 110 was programmed to switch at a Bop of 80 gauss and had a Bhys of 10 gauss, Hall element 110 would initiate a switch at 80 gauss and change its state at 70 gauss. Because a magnetic field is generated when coil 96 is energized, two distinct gauss curves are created. The upper curve depicts the field density present when the electro-magnet of solenoid assembly 52 is energized. The lower curve represents the magnetic field density generated by the permanent magnet alone when the coil 96 is not energized. As shown, a relatively large hysteresis is introduced into the system by operation of solenoid assembly 52.

In the embodiment depicted in FIG. 11, sensor assembly 59 moves from a location where distance "Y" equals 4 mm and distance "X" equals 8 mm. Sensor assembly 59 does not output a signal indicating that the differential assembly is in the locked condition until sensor assembly 59 reaches a distance of 7.8 mm of spacing between first face 112 and outer surface 139. During coil 96 deenergization, sensor assembly 59 does not output a signal indicating that the differential assembly is unlocked until the spacing between the Hall element and the permanent magnet is 4.8 mm. As such, a total mechanical hysteresis of approximately 3 mm exists with the single sensor embodiment. Depending on the operational characteristics of the mechanical system including sensor assembly 59, this magnitude of hysteresis may or may not be acceptable.

Figure 12:
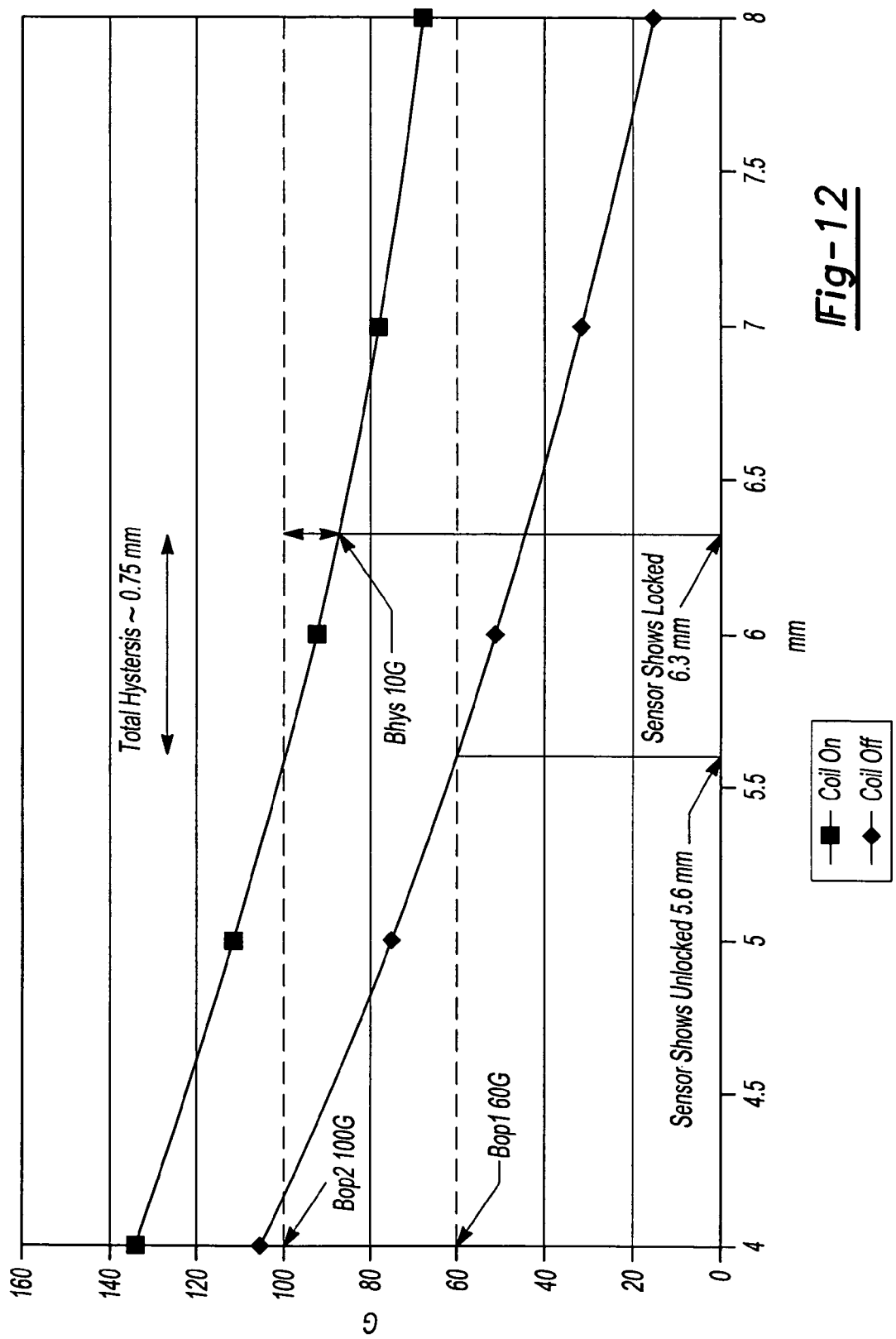
FIG. 12 is a graph showing magnetic field density vs. distance for a second embodiment sensor assembly.

FIG. 12 is a graph showing magnetic field density versus distance for the second embodiment sensor assembly 200 shown in FIG. 10. To reduce the magnitude of mechanical hysteresis, Hall elements 202 and 204 of sensor assembly 200 are configured in accordance with FIGS. 10 and 12. First Hall element 202 is set to have an operating point of 60 gauss while second Hall element 204 is set to have an operating point of 100 gauss. During operation, second Hall element 204 outputs a signal indicating that the differential assembly is in the locked condition once the magnetic field density reduces from 100 gauss to 90 gauss. This condition occurs when the spacing between second Hall element 204 and outer surface 139 of magnet 130 is approximately 6.3 mm. At electromagnet deenergization, first Hall element 202 outputs a signal indicative of an open differential condition once the magnetic field density changes from 50 to 60 gauss. This condition exists when first Hall element 202 is spaced from outer surface 139 a distance of approximately 5.6 mm. One skilled in the art will appreciate that the total mechanical hysteresis is now approximately 0.75 mm when using two Hall elements with different operating points.

The circuit 198 depicted in FIG. 10 includes first Hall effect sensor 202 and second Hall effect sensor 204. First Hall effect sensor 202 is coupled in series with a differential gain amplifier 232. Differential gain amplifier 232 is coupled to the base of a current gain transistor 234. A constant current source 236 is supplied to the collector leg of current gain transistor 234. The emitter leg of current gain transistor 234 provides an output signal labeled as $I_{OUT1}$.

In similar fashion, second Hall effect sensor 204 is connected in series with a differential gain amplifier 240. Differential gain amplifier 240 is coupled to the base of a current gain transistor 242. Constant current source 236 is supplied to the collector leg of current gain transistor 242. The emitter leg of current gain transistor 242 provides an output signal labeled as $I_{OUT2}$. Controller 148 analyzes $I_{OUT1}$ and $I_{OUT2}$ to determine the operating mode of differentiation as being locked or unlocked. When both $I_{OUT1}$ and $I_{OUT2}$ are low or zero, controller 148 determines that the differential is operating in the locked mode. When $I_{OUT1}$ and $I_{OUT2}$ are both high or one, controller 148 determines that the differential is operating in the unlocked mode.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A power transmitting device comprising:
    a housing;
    a case rotatably positioned within said housing, said case defining an interior cavity;
    a pair of pinion gears rotatably supported in said interior cavity;
    a pair of side gears rotatably supported in said interior cavity, wherein each of said pinion gears drivingly engages each of said side gears;
    an electrically operable coupling including an electromagnet, said coupling including an axially moveable member operable to drivingly connect one of said side gears with said case; and
    a sensor coupled to one of said housing, said case and said axially moveable member, said sensor being operable to output a signal indicative of the position of said axially moveable member.

2. The power transmitting device of claim 1 further including a controller in communication with said coupling, said controller being operable to selectively operate said coupling to place said power transmitting device in a locked condition or an open condition.

3. The power transmitting device of claim 2 wherein said controller operates said coupling in response to a vehicle signal being one of the group consisting of a wheel speed, a wheel speed differential, a transfer case range position, a gear position, a vehicle speed, a brake application or a change in wheel speed.

4. The power transmitting device of claim 1 wherein said coupling includes a ring selectively engageable with said one of said side gears, said ring being rotationally retained by said case and axially moveable relative to said case.

5. The power transmitting device of claim 4 further including a spring biasing said ring toward a position disengaged from said one of said side gears.

6. The power transmitting device of claim 1 wherein said sensor is a hall effect type sensor operable to output a signal indicative of the proximity of a target to said sensor.

7. The power transmitting device of claim 6 wherein said target is a magnet mounted to one of said housing, said and said axially moveable member.

8. The power transmitting device of claim 1 further including a second sensor operable to output a signal indicative of the position of said axially moveable member, said sensor being operable to provide a signal indicative of a first magnetic field density, said second sensor being operable to provide a signal indicative of a second magnetic field density less than said first magnetic field density.

9. The power transmitting device of claim 8 wherein said second sensor is a hall effect type sensor.

10. The power transmitting device of claim 1 further including a connector extending through an aperture formed in said housing, said connector including a plurality of terminals electrically coupled to said sensor and said coupling.

11. A power transmitting device comprising:
    a housing;
    an input shaft rotatably positioned in the housing;
    at least one output shaft rotatably positioned in the housing;
    a case rotatably positioned in the housing:
    a gear set positioned in the case, the gear set transmitting rotary power between the input shaft and the at least one output shaft;
    an electrical actuator having a linearly moveable member, the actuator being operable to drivingly engage the moveable member with the gear set; and
    a sensor positioned within the housing and operable to output a signal indicative of the linear position of the moveable member, wherein one of the sensor and a sensor target is mounted to the moveable member and translates with the moveable member.

12. The power transmitting device of claim 11 wherein the moveable member is coupled to the case for rotation therewith.

13. The power transmitting device of claim 12 wherein the sensor is operable to output a signal when the sensor is positioned at a predetermined distance from the target.

14. The power transmitting device of claim 13 wherein the target is a magnet.

15. The power transmitting device of claim 11 wherein the electrical actuator includes an electromagnet.

16. The power transmitting device of claim 15 further including a second sensor operable to output a signal indicative of the position of said moveable member, said sensor being operable to provide a signal indicative of a first magnetic field density, said second sensor being operable to provide a signal indicative of a second magnetic field density less than said first magnetic field density.

17. A method of detecting locked and unlocked modes of differentiation between rotating shafts in a differential having a case and a side gear, the method comprising:
mounting a sensor to one of an axially moveable member and a fixed member;
mounting a target on the other of said axially moveable member and said fixed member;
outputting a first sensor signal when said axially moveable member is in a first position relative to said target being indicative of a locked mode of differentiation where the case is coupled for rotation with the side gear; and
outputting a second sensor signal when said axially moveable member is in a second position relative to said target being indicative of an unlocked mode of differentiation when the case is not coupled for rotation with the side gear.

18. The method of claim 17 further including providing a magnet as the target.

19. The method of claim 18 further including rotatably interconnecting said sensor and an electromagnet coil, said electromagnet coil being operable to move said axially moveable member.

20. The method of claim 19 further including restricting said sensor from rotation with said case.

21. The method of claim 20 further including allowing said electromagnet coil to rotate relative to said case.

22. The method of claim 17 further including mounting a second sensor to said one of an axially moveable member and a fixed member and outputting a third sensor signal indicative of an axial position of said second sensor.

23. A method of detecting locked and unlocked modes of differentiation between rotating shafts in a differential having a case and a side gear, the method comprising:
mounting first and second sensors to one of an axially moveable member and a fixed member;
mounting a target on the other of said axially moveable member and said fixed member;
outputting a first signal from said first sensor when said first sensor is exposed to a first magnitude of magnetic field density;
outputting a second signal from said second sensor when said second sensor is exposed to a second magnitude of magnetic field density less than said first magnitude of magnetic field density;
determining the modes of differentiation based on said first and second signals.

24. The method of claim 23 wherein the step of determining the mode of differentiation includes determining if said first signal and said second signal are low thereby indicating an open or a locked mode of differentiation.

25. The method of claim 24 wherein the step of determining the mode of differentiation includes determining if both said first and second signals are high and thereby indicating the other of said open or closed mode of differentiation.

26. A power transmitting device comprising:
a housing;
an input shaft rotatably positioned in the housing;
at least one output shaft rotatably positioned in the housing;
a gear set positioned in the housing, the gear set transmitting rotary power between the input shaft and the at least one output shaft;
an electrical actuator having an electromagnet and a linearly moveable member, the actuator being operable to drivingly engage the moveable member with the gear set; and
a sensor positioned within the housing and operable to output a signal indicative of the linear position of the moveable member.

27. The power transmitting device of claim 26 wherein one of the sensor and a sensor target is mounted to the moveable member and translates with the moveable member.

28. The power transmitting device of claim 27 wherein the sensor is operable to output a signal when the sensor is positioned at a predetermined distance from the target.

29. The power transmitting device of claim 28 wherein the target is a magnet.

30. The power transmitting device of claim 26 further including a second sensor operable to output a signal indicative of the position of said moveable member, said sensor being operable to provide a signal indicative of a first magnetic field density, said second sensor being operable to provide a signal indicative of a second magnetic field density less than said first magnetic field density.

31. An axle assembly comprising:
an axle housing;
first and second axleshafts rotatably supported by said axle housing;
a differential assembly rotatably supported by said axle housing and including an input member, a first output member coupled to said first axleshaft, and a second output member coupled to said second axleshaft;
an electrically operated coupling having an electromagnet and an axially moveable locking member operable to releaseably couple said first output member to said input member; and
a sensor coupled to one of said axle housing, said input member and said locking member and which is operable to output a signal indicative of the position of said locking member.

32. The axle assembly of claim 31 wherein said input member is a differential case rotatably supported in a central interior cavity of said axle housing, said first output member is a first side gear fixed for rotation with said first axleshaft and said second output member is a second side gear fixed for rotation with said second axleshaft, and wherein said locking member is operable in a first position to couple said first side gear to said differential case and in a second position to permit said first side gear to rotate relative to said differential case.

33. The axle assembly of claim 32 wherein said sensor is operable to output a signal indicative of the proximity of a target to said sensor, and wherein said target is fixed to one of said axle housing, said differential case and said locking member.

* * * * *